3,458,482
POLYMERIZATION OF CAPROLACTAM
Michio Goto, Yutaro Takahishi, and Etsuo Otohata, Mihara-shi, Japan, assignors to Teijin Limited, Osaka, Japan, a corporation of Japan
No Drawing. Filed Oct. 6, 1966, Ser. No. 584,662
Int. Cl. C08g 20/14
U.S. Cl. 260—78                     6 Claims

ABSTRACT OF THE DISCLOSURE

In the continuous polymerization of caprolactam in the presence of water which comprises heating and thereby polymerizing caprolactam at a temperature between 180 to 300° C. under steam pressure in a first agitation stage thereby forming a polycaproamide polymerization reaction mixture containing water; and continuously transferring the polycaproamide polymerization reaction mixture containing water to a second agitation stage, reducing the pressure to about atmospheric, and continuing the polymerization of the polymerization reaction mixture at about atmospheric pressure and within the above temperature range in the presence of an inert gas stream thereby dehydrating the polymerization reaction mixture and producing a polymer having a high degree of polymerization, the improvement which comprises continuously transferring the polymerization reaction containing water from said first agitation stage into and through a plug flow zone and maintaining the polymerization reaction mixture containing water in the plug flow zone under plug flow conditions at a temperature between 260 to 315° C. under steam pressure for a period of time of at least 30 minutes. The polymerization reaction mixture containing water is then transferred to the second agitation stage thereby reducing the amount of time required in the second agitation stage for producing a polymer having a high degree of polymerization.

---

The present invention relates to continuous polymerization of caprolactam and is particularly concerned with reducing the time required for the polymerization process.

It is well-known to produce polyamides by heating epsilon-caprolactam at 180–300° C. in the presence of a suitable catalyst. In particular, in the polymerization process of caprolactam which is carried out in the presence of water alone or water and an acid catalyst or water and a basic catalyst, a conventional process involves a first stage carried out under steam pressure (e.g. 100–350 p.s.i.g.) followed by a second stage wherein the degree of polymerization is raised while carrying out dehydration at normal atmospheric pressure or reduced pressure. (Hereinafter the first stage will be referred to herein as the first period reaction while the second stage will be referred to as the second period reaction.) The method of carrying out this reaction batchwise, as can be readily conceivable, results in a tendency to nonuniformity in the degree of polymerization and corresponding properties of the resulting polymer. Numerous continuous polymerization processes have been proposed, but they all possess shortcomings. For instance, a process has been proposed using a series of tanks equipped with agitators, the first tank being under steam pressure, the second tank, which serves as dehydration means, being under atmospheric or reduced pressure and, if necessary, as means for normalizing the degree of polymerization, a third tank at atmospheric pressure. However, in this process, as a result of short passing and back mixing the effluent from each tank includes product of various degrees of polymerization. This leads to difficulty in controlling the reaction, and for obtaining polymers of uniformly high degree of polymerization a much longer than desirable time is required.

It has been proposed to employ a heated reaction tower wherein piston or plug type flow is imparted to the polymer by reducing the inner diameter, or by installing baffles or packing. In these systems the heat transmitting and the dehydrating abilities are lessened, and hence it is difficult to handle large amounts.

Further there has been proposed to employ a long heated reaction tube, which has been bent in various ways, the chief emphasis being placed on the piston or plug flow property. However, this system lacks dehydrating ability. It also has been proposed to use therewith a heated reaction tower for the second reaction period, or apparatus which accomplishes the dehydration by discharging the reaction mixture in atomized fashion or an apparatus wherein the reaction mixture is flowed over an inner wall by centrifugal force.

The treatment capacity of these processes per unit apparatus is small. Accordingly, many parallel units of apparatus are required and capital cost is high. Again, since control during the progress of the reaction is difficult, there is the drawback of nonuniformity between products of the several units.

Further, it has been proposed to move the reaction mass with a horizontal rotating screw, but this also has many problems from the technical standpoint, including low capacity and high equipment cost.

When the prior processes, as hereinbefore described, are viewed from the commercial standpoint, the process wherein tanks are connected in series has the advantage that its treatment capacity is great and nonuniformity in its product is small but, on the other hand it has the drawback that a much longer time is required than in the case of the batchwise process in obtaining polymers of high degree of polymerization.

In general, in the early stage of the polymerization of caprolactam in the presence of either water alone, or water and an acid catalyst or water and a basic catalyst, it is known that an induction period exists and that this period varies depending upon the class and quantity of the catalyst. For example, when 3 parts of water are added to 200 parts of caprolactam and the polymerization reaction is carried out at 265° C., there is an induction period of about 50 minutes. When the reaction is carried out under the above conditions in an autoclave under steam pressure, equilibrium is reached in about 4 hours and a polymer having an inherent viscosity ($\eta$) of 0.6 in metacresol and containing a hot water extractable portion of 11.6% is obtained. When the second period reaction of this polymer is carried out by heating it to 265° C. under an inert gas stream at normal atmospheric pressure, 3.0 hours are required to obtain a polymer having an inherent viscosity ($\eta$) of 1.35 in metacresol.

The table below shows the second period reaction times in hours required for obtaining a polymer having an inherent viscosity ($\eta$) of 1.35 in metacresol when the second period reaction is carried out under identical conditions by mixing with polymer from the first period 10–30% of unequilibrated polymer (U.P.)

TABLE

[Second period reaction times in hours required obtaining a polymer having viscosity ($\eta$) of 1.35]

| First period reaction time (hr.) | 1 0.5 | 1.0 | 2.0 | 3.0 |
|---|---|---|---|---|
| 10% U.P | 8.0 | 4.0 | 2.8 | 3.0 |
| 20% U.P | 8.5 | 4.2 | 3.0 | 2.2 |
| 30% U.P | 9.0 | 4.2 | 3.5 | 3.5 |

1 At the end of 0.5 hr. the reaction was still in the induction period.

The results shown in the table are of great interest.

Namely, even when up to 30% of polymers whose induction period has passed is mixed there was hardly any effect on the time required to reach a high degree of polymerization. In contrast, in the case of the polymers which were still in their induction period, a marked decrease in the speed was shown even with only a mixture of 10% unequilibrated polymer.

When the series-connected tank type of apparatus is used for the continuous polymerization of caprolactam, the occurrence of differences of the residence times of portions of the reaction mixture being transferred from the first stage where the first period reaction is effected to the second stage where the second period reaction is effected cannot be avoided. The amount of those reactants whose residence times are different will depend upon factors such as the capacity and shape of the tank and type of agitator, etc., but in a system on the order of 4000-liter capacity and an average residence time of 4–5 hours, the presence of about 10% of reactants with a residence time less than one hour is observed.

When these facts were put together and considered, the conclusion reached was that the cause for the decline in the speed of the agitating tank continuous type was due to admixture of those reactants whose residence times were short, and particularly due to the phenomenon of short passing of the reaction mixture during the induction period. The present invention was achieved on the basis of such findings.

The present invention is directed to a process for continuous polymerization of caprolactam wherein polymerizing caprolactam in the presence of water alone or water and an acid catalyst or water and a basic catalyst, a plug flow is imparted to a high degree to the reactants during the first period reaction at a temperature of 260 to 315° C. under steam pressure, for at least a period of the residence time equalling the induction period.

In practicing the present invention, the following specific methods can be employed.

(1) In polymerizing caprolactam, the continuous polymerization reaction is carried out employing as the apparatus for carrying out the first period reaction under steam pressure a known apparatus which imparts a high degree of plug flow to the reactants. Specifically included are such apparatus as a vertical heated reaction tube, or heated long tubes which have been bent in varied manner, or a reaction tower equipped with baffles or packed with fillers, or a horizontal rotating screw type apparatus, etc., and as the apparatus for carrying out the second period reaction an apparatus consisting of agitating tanks connected in series. Thus, the degree of polymerization is further enhanced, or if necessary, stabilized.

(2) The continuous polymerization of caprolactam is carried out by dividing the first period reaction apparatus into two zones, and employing in the first zone an agitating tank type polymerization apparatus, while employing in the second zone an apparatus which imparts plug flow to the reactants (as a specific example, an apparatus similar to that illustrated in (1), above); and employing as the apparatus for the second period reaction one similar to that described in (1), above.

Regardless of whatever of the foregoing methods are used, the decline in the polymerization speed resulting from short passing, the defect of the agitating tank type apparatus, can be prevented by imparting a high degree of plug flow to the reactants in the first period reaction, as illustrated in the examples; and, by using the agitating type tanks in the second period reaction, the effects of dehydration and heat transmission are enhanced thereby bringing about a tremendous improvement in the productive capacity.

Next, examples of the present invention will be given, but needless to say the invention method is not to be limited by these examples.

Example 1

These parts of water and 1 part of stabilizer for polyamide use were mixed with 200 parts of epsilon-caprolactam, and stirred, after which this mixture was flowed continually into a first agitating tank held at a temperature of 265° C. under steam pressure (35.5 p.s.i.g.) and reacted in the form of an agitated mass with an average residence time of 4 hours. Next, the reaction mixture was conducted continually to a second agitating tank held at 265° C. under a stream of dry nitrogen at about atmospheric pressure and while carrying out the dehydration the degree of polymerization was raised while the mixture was in the form of an agitated mass from which product was continually withdrawn. After an average residence time of 8 hours, the inherent viscosity ($\eta$) of the polymer in metacresol was 1.35.

When the polymer after being discharged from the first agitating tank was conducted to the second agitating tank by passing it through a circular pipe at a temperature of 265° C. under plug flow conditions to prolong its residence time by 1 hour, the residence time required for obtaining a polymer having an inherent viscosity ($\eta$) of 1.35 in metacresol was shortened by 3 hours.

Example 2

When residence time of a polymer discharge from the first agitating tank under conditions identical to those of Example 1 was prolonged by 1 hour by passing it at a temperature of 265° C. under steam pressure through a reaction tower, the structure of which had been modified by baffles to provide a passage long enough to impart plug flow, a polymer having an inherent viscosity ($\eta$) of 1.35 in metacresol was obtained with an average residence time of 3.5 hours in the second agitating tank.

Example 3

Three parts of water, 4 parts of $\epsilon$-aminocaproic acid and 1 part of a polyamide stabilizer were added to 200 parts of caprolactam, after which the mixture was mixed with stirring and and then flowed into a first agitating tank held at 265° C. under steam pressure with an average residence time of 3.5 hours. Next, the reaction mixture was conducted to a second agitating tank held at 265° C. under a stream of nitrogen where its degree of polymerization was raised while carrying out its dehydration, until its inherent viscosity in metacresol reached 1.35. The residence time required was 7 hours. When the first tank and the second tank were connected with a circular heated pipe which imparted plug flow to the reactants by which a residence time of 30 minutes was obtained, the residence time required in the second tank was shortened by 3 hours.

Example 4

After mixing caprolactam, water $\epsilon$-aminocaproic acid and stabilizer in the same proportions as in Example 3, the mixture was passed under steam pressure through a vertical reaction tower at a temperature of 265° C. under plug flow conditions with a residence time of 3 hours, following the reaction mixture was conducted to an agitating tank held at 265° C. under a stream of nitrogen. As a result, the time required in the agitating tank, for obtaining a polymer whose inherent viscosity in metacresol was 1.35, was 3.5 hours.

We claim:

1. In the continuous polymerization of caprolactam in the presence of water which comprises heating and thereby polymerizing caprolactam at a temperature between 180 to 300° C. under steam pressure in a first agitation stage thereby forming a polycaproamide polymerization reaction mixture containing water; and continuously transferring the polycaproamide polymerization reaction mixture containing water to a second agitation stage, reducing the pressure to about atmospheric, and continuing the polymerization of the polymerization reaction mixture at about atmospheric pressure and within the above temperature range in the presence of an inert gas stream thereby dehydrating the polymerization reaction mixture and producing a polymer having a high degree of polymerization, the improvement which comprises continuously transferring the polymerization reaction mixture containing water from said first agitation stage into and through a plug flow zone and maintaining the polymerization reaction mixture containing water in said plug flow zone under plug flow conditions at a temperature between 260 to 315° C. under steam pressure for a period of time of at least 30 minutes; and then continuously transferring the polymerization reaction mixture containing water to said second agitation stage thereby reducing the amount of time required in said second agitation stage for producing a polymer having a high degree of polymerization.

2. The process of claim 1 wherein the polymerization is continued in said second agitation stage until the polymer has an inherent viscosity of at least 1.35 in metacresol.

3. The process of claim 1 wherein the steam pressure is between 100 to 350 p.s.i.g.

4. In the continuous polymerization of caprolactam in the presence of water which comprises heating and thereby polymerizing caprolactam at a temperature between 180 to 300° C. under steam pressure in a first agitation stage thereby forming a polycaproamide polymerization reaction mixture containing water; and continuously transferring the polycaproamide polymerization reaction mixture containing water to a second agitation stage, reducing the pressure to about atmospheric, and continuing the polymerization of the polymerization reaction mixture at about atmospheric pressure and within the above temperature range in the presence of an inert gas stream thereby dehydrating the polymerization reaction mixture and producing a polymer having a high degree of polymerization, the improvement which comprises replacing said first agitation stage with a plug flow stage and heating and thereby polymerizing said caprolactam at a temperature between 260 to 315° C. under steam pressure in said plug stage under plug flow conditions for a period of time of at least 50 minutes thereby forming a polycaproamide polymerization mixture containing water; and then continuously transferring the polymerization reaction mixture containing water to said second agitation stage thereby reducing the amount of time required in said second agitation stage for producing a polymer having a high degree of polymerization.

5. The process of claim 4 wherein the polymerization is continued in said second agitation stage until the polymer has an inherent viscosity of at least 1.35 in metacresol.

6. The process of claim 4 wherein the steam pressure is between 100 to 350 p.s.i.g.

References Cited

UNITED STATES PATENTS

| | | | |
|---|---|---|---|
| 2,562,796 | 7/1951 | Koch | 260—78 |
| 2,735,839 | 2/1956 | Schrenk | 260—78 |
| 2,735,840 | 2/1956 | Lynch | 260—78 |
| 2,889,211 | 6/1959 | Rodenacker et al. | 260—78 |
| 3,044,993 | 7/1962 | Tiemersma | 260—78 |
| 3,047,541 | 7/1962 | Ryffel et al. | 260—78 |
| 3,294,756 | 12/1966 | Russell et al. | 260—78 |
| 3,171,829 | 3/1965 | Wiesner et al. | 260—78 |

HAROLD D. ANDERSON, Primary Examiner

U.S. Cl. X.R.

260—95